No. 616,551. Patented Dec. 27, 1898.
W. E. NAGEBORN.
BICYCLE.
(Application filed Aug. 5, 1897.)

(No Model.) 2 Sheets—Sheet 1.

Inventor
Wilhelm E. Nageborn
By Kross Sprague & Son
Attys.

Witnesses

THE NORRIS PETERS CO., PHOTO-LITHO., WASHINGTON, D. C.

No. 616,551. Patented Dec. 27, 1898.
W. E. NAGEBORN.
BICYCLE.
(Application filed Aug. 5, 1897.)
(No Model.) 2 Sheets—Sheet 2.
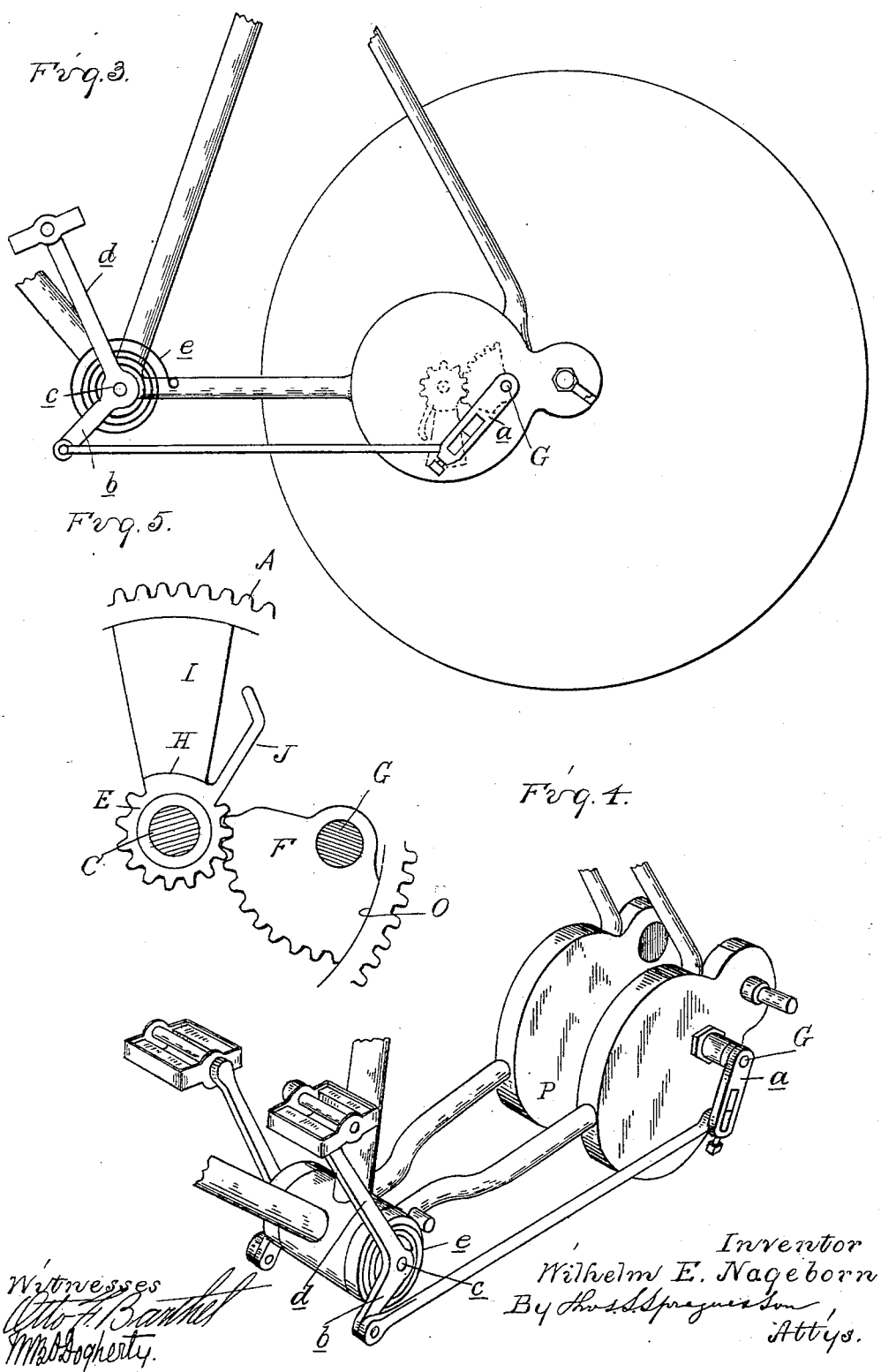

UNITED STATES PATENT OFFICE.

WILHELM E. NAGEBORN, OF DETROIT, MICHIGAN, ASSIGNOR OF ONE-HALF TO FRED C. ANDREWS, OF SAME PLACE.

BICYCLE.

SPECIFICATION forming part of Letters Patent No. 616,551, dated December 27, 1898.

Application filed August 5, 1897. Serial No. 647,154. (No model.)

*To all whom it may concern:*

Be it known that I, WILHELM E. NAGEBORN, a citizen of the United States, residing at Detroit, in the county of Wayne and State of Michigan, have invented certain new and useful Improvements in Bicycles, of which the following is a specification, reference being had therein to the accompanying drawings.

The invention relates to a drive-gear designed for bicycles or for other vehicles or machines in which a reciprocating motion is to be transferred into a rotary motion.

The invention consists of a gear-wheel having within its circumference, arranged in axial relation thereto, a segment or interrupted pinion adapted to be connected with the gear-wheel by a clutch and a rocking segment meshing with the pinion.

The invention further consists in so constructing these parts that in addition to propelling the device by a proper motion of the actuating device beyond the normal movement a brake may be applied thereto.

The invention further consists in the construction, arrangement, and combination of the various parts, all as more fully hereinafter described.

Figure 1:
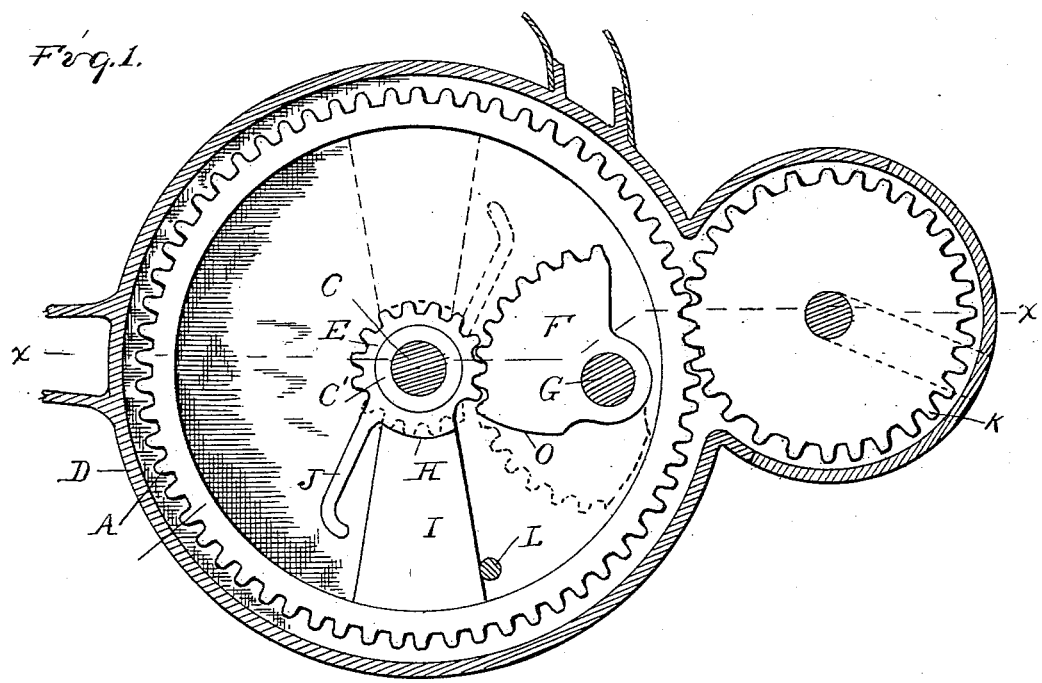
Figure 2:
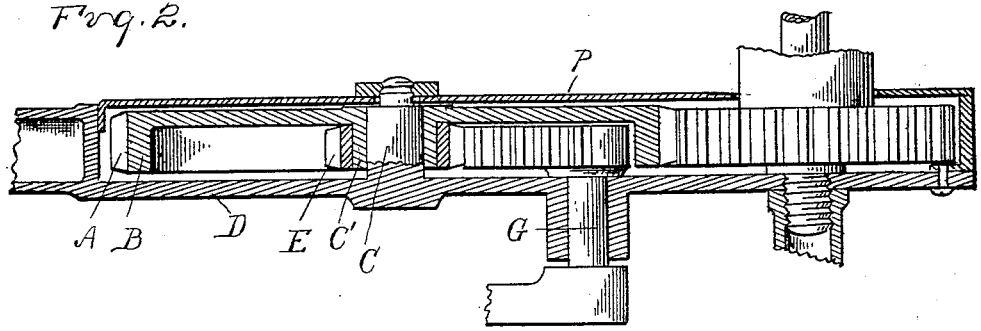
Figure 6:
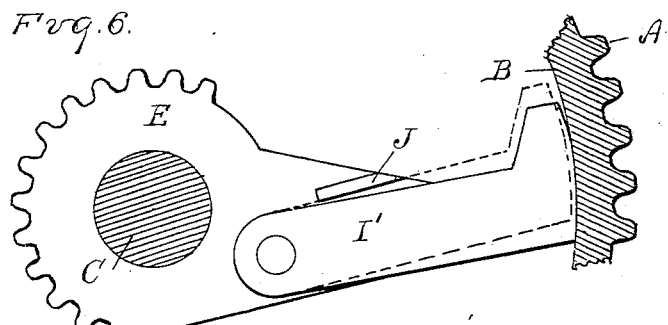

In the drawings, Figure 1 is a central elevation of my invention, showing in full and dotted lines the different positions of the parts in operating the same. Fig. 2 is a section on line $xx$ on Fig. 1. Fig. 3 is a side elevation of the rear part of the bicycle, showing my invention applied thereto. Fig. 4 is a perspective of part of the bicycle-frame, illustrating the application of my device to a bicycle. Fig. 5 is an elevation similar to Fig. 1, showing the parts in position for use as a brake. Fig. 6 is a slightly-modified form of clutch from that shown in the other figures.

My improved gear device, while particularly adapted for use in driving bicycles, tricycles, and similar vehicles, is adapted also for other work, such as driving blowers for forges and other light machinery, and I do not desire that my invention shall be limited to its application to vehicles.

A is a gear-wheel having a flange B on one side and forming what I shall refer to as a "flanged" gear-wheel. This wheel is journaled on a pin or stub-shaft C, which projects from the frame or casing D, the wheel being preferably provided with a suitable hub $C'$. This hub has two functions—that of giving a suitable support for the wheel and of forming a journal for a wheel or pinion E, sleeved thereon. This wheel E may be a gear-pinion, or it may be merely provided with a segment of a gear, as shown at $E'$, and with this segment or pinion engage the teeth on a rocking segment F, which is secured to a stub-shaft or pin G, journaled in the casing. This rocking segment is within the flange P of the gear-wheel, and by making it thus as a segment I am enabled to actuate the wheel E at greater speed—that is, to gear it up—and still have all the parts or gears within the flange B of the driven wheel.

The wheel E, I connect to the gear-wheel by any suitable clutch device which shall connect the two in the forward movement of the wheel E and loosened therefrom in the return movement.

The clutch which I have shown and which I prefer is that illustrated in Fig. 1, in which the wheel E is provided with a gear-segment on one side and on the other side is provided with a cam, incline, or wedge face H, which bears against a corresponding face on the clutch-block I, which extends to the flange B of the gear-wheel, all so arranged that as the wheel E is turned in one direction the wedge H will force the block I against the flange, and thus couple the two parts together, and in the reverse direction the cam H will move away from the block and allow it to freely return, which return movement is aided by the arm or stop J, carried by the wheel E. The free end of the arm is constructed to abut against the block I upon the return movement of the wheel E for the purpose of returning the block to its initial position. A slightly-modified form of this clutch is shown in Fig. 6, the dog or block I being shown as a pivoted dog $I'$, the pivotal point being eccentrically arranged to effect the same result of clutching the wheel in one direction and releasing in the opposite direction of the movement of the wheel E, a similar stop J being provided to hold the dog or block in proper position for the reëngagement in the reverse direction.

The pin G may be connected with any suitable source of power for rocking the same, and I have shown the device applied to a bicycle. The pin is provided in that case with the rock-arm $a$ and connected with the bell-crank $b$ on the pedal-shaft $c$, which has the arm $d$, there being two of these bell-cranks and connections, one on each side, for use alternately in the usual manner. I have shown a suitable spring $e$ for returning the pedal to its upper position after each actuation. With the device thus far described it is evident that the depression of the pedal will rock the segment F, which in turn will rock the wheel E, turning the parts from the position shown in full lines in Fig. 1 to the position shown in dotted lines therein, and in this forward movement the gear-wheel A will be carried with the wheel E. The gear-wheel A, I have shown meshing with a pinion K on the shaft of the rear wheel, which thereby is driven. As the two pedals act successively upon the rear wheel, a continuous progressive motion is thereby imparted thereto.

At the limit of movement of the clutch-block I, I arrange a stop L upon the opposite side from the stop J, so that this block will be held from being acted on by the cam or incline H if the wheel A is reversed—as, for instance, in backing the wheel.

Any other suitable means may be employed for rendering the clutch inoperative during the reverse movement; but with this particular form of clutch I find the stop a simple and effective device.

By having the rocking segment F located within the flange of the gear-wheel A, I am enabled to gear up the wheel materially by the reciprocating movement referred to and get a much more compact device than would be the case if the gear-wheel were used of the same radius and which would necessarily be outside of the gear-wheel B.

It will be observed that with the construction shown in Fig. 1 the segment F comes very close to the flange of the wheel A at the end of each movement thereof. A normal movement of this segment, however, does not cause the segment to strike the flange; but if the pedal is depressed beyond its normal movement the segment F will be carried into contact with the flange and if held there will act as a brake for the device. To this end I provide a shoe or bearing-face O on that part of the segment which will contact the flange of the wheel A, so as to make the brake most effective. I have shown the gear-wheels inclosed in suitable casing P.

What I claim as my invention is—

1. In a drive-gear, the combination of the gear-wheel and an actuating device therefor, comprising a concentrically-arranged driven pinion or gear-segment, a rocking sector meshing directly with the pinion or segment, arranged and adapted to operate in the same plane as said pinion or gear-segment, and a clutch coupling the driven pinion or segment with the gear-wheel.

2. In a drive-gear, the combination of the flanged gear-wheel and an actuating device therefor, comprising a cencentrically-arranged driven pinion or gear-segment, a rocking sector meshing directly with the pinion or segment, said sector being located entirely within the flange of the gear-wheel and arranged and constructed to operate in the same plane as said driven pinion or segment, and a clutch forming a coupling between the flange on the gear-wheel and the driven pinion or segment.

3. In a drive-gear, the combination with the flanged gear-wheel to be driven, a wheel or sleeve concentrically arranged within the flange, having a portion of its circumference formed into a gear-segment and another portion carrying a dog actuated by the rotary motion thereof, and a rocking segment directly meshing with the gear-segment on the inner wheel, arranged entirely, and constructed to operate in the same plane as said inner wheel, substantially as described.

4. The combination of a flanged gear-wheel, having a hub projecting within the flange, a toothed wheel journaled on the hub, a clutch acting to bind the inner wheel to the gear-wheel and a rocking segment within the flange meshing with the teeth on the inner wheel.

5. In a drive-gear, the combination with a gear-wheel having an inwardly-extending hub, and an annular flange concentrically arranged about the hub, of a wheel journaled on the hub within the flange, having a gear-segment thereon, a dog constructed and arranged to bind the segment to the annular flange upon movement of the segment in one direction, and to release the said parts upon the movement of the segment in the opposite direction, and a rocking sector journaled and constructed to operate in the same plane as the driven segment, said sector being arranged entirely within the annular flange and adapted to mesh directly with the teeth on the segment.

6. The combination with the flanged gear-wheel an inwardly-projecting hub thereon, an inner wheel sleeved on its hub within its flange, the dog actuated by the turning of the inner wheel in one direction to bind against the flange, and to release in the opposite direction and a stop or finger carried by the inner wheel to hold the dog in proper position during its return movement.

7. The combination of the flanged gear-wheel an inwardly-projecting hub thereon, the inner wheel journaled on the hub of the gear-wheel within the flange, the block or dog I adapted to be forced against the flange by the turning in one direction of the inner wheel, and to be released by the opposite movement, and a stop, such as L at the end of the return movement, to hold the dog, for the purpose described.

8. In a drive-gear, the combination with a gear-wheel having a flange thereon, of a concentric inner wheel carrying a toothed portion, a clutch adapted to connect the two wheels, and a rocking sector mounted in proximity to the flange, said sector having a bearing thereon adapted to strike against said flange, when moved beyond its normal travel, to form a brake.

In testimony whereof I affix my signature in presence of two witnesses.

WILHELM E. NAGEBORN.

Witnesses:
M. B. O'DOGHERTY,
OTTO F. BARTHEL.